US010252239B2

(12) United States Patent
Abolhasani et al.

(10) Patent No.: US 10,252,239 B2
(45) Date of Patent: Apr. 9, 2019

(54) MULTI-PHASE OSCILLATORY FLOW REACTOR

(71) Applicant: Massachusetts Institute of Technology, Cambridge, MA (US)

(72) Inventors: Milad Abolhasani, Raleigh, NC (US); Connor Wilson Coley, Cambridge, MA (US); Klavs F. Jensen, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/235,730

(22) Filed: Aug. 12, 2016

(65) Prior Publication Data

US 2017/0043313 A1    Feb. 16, 2017

Related U.S. Application Data

(60) Provisional application No. 62/205,088, filed on Aug. 14, 2015.

(51) Int. Cl.
*B01J 19/00* (2006.01)
*B01J 19/18* (2006.01)

(52) U.S. Cl.
CPC ....... *B01J 19/0033* (2013.01); *B01J 19/0093* (2013.01); *B01J 19/185* (2013.01); *B01J 2219/00011* (2013.01); *B01J 2219/0084* (2013.01); *B01J 2219/0086* (2013.01); *B01J 2219/0097* (2013.01); *B01J 2219/00162* (2013.01); *B01J 2219/00792* (2013.01); *B01J 2219/00795* (2013.01); *B01J 2219/00806* (2013.01); *B01J 2219/00813* (2013.01); *B01J 2219/00815* (2013.01); *B01J 2219/00817* (2013.01); *B01J 2219/00833* (2013.01); *B01J 2219/00835* (2013.01); *B01J 2219/00869* (2013.01); *B01J 2219/00873* (2013.01); *B01J 2219/00936* (2013.01);
(Continued)

(58) Field of Classification Search
CPC .. B01J 19/1812; B01J 19/1868; B01J 19/185; B01J 19/2415; B01J 19/2435; B01J 2219/0052; B01J 2219/00011; B01J 2219/00162; B01J 2219/00792; B01J 2219/00833; B01J 2219/0084; B01J 2219/0086; B01J 2219/00869; B01J 2219/0097; B01J 2219/00961; B01J 2219/00963; B01J 2219/0295; B01J 19/0033; B01J 19/0093
See application file for complete search history.

(56) References Cited

U.S. PATENT DOCUMENTS 9,132,396 B2    9/2015  Churski et al.
2009/0304890 A1  12/2009  Ni et al.
2014/0147908 A1  5/2014  Jakiela et al.

OTHER PUBLICATIONS

Invitation to Pay Fees dated Oct. 3, 2016 in connection with International Application No. PCT/US2016/046749.
(Continued)

*Primary Examiner* — Lessanework Seifu
(74) *Attorney, Agent, or Firm* — Wolf, Greenfield & Sacks, P.C.

(57) ABSTRACT

According to some aspects, described herein is an automated droplet-based reactor that utilizes oscillatory motion of a droplet in a tubular reactor under inert atmosphere. In some cases, such a reactor may address current shortcomings of continuous multi-phase flow platforms.

20 Claims, 18 Drawing Sheets

(52) U.S. Cl.
CPC ............... *B01J 2219/00943* (2013.01); *B01J 2219/00961* (2013.01); *B01J 2219/00986* (2013.01)

(56) References Cited

OTHER PUBLICATIONS

International Search Report and Written Opinion dated Dec. 15, 2016 in connection with International Application No. PCT/US2016/046749.

Abolhasani et al., Oscillatory three-phase flow reactor for studies of bi-phasic catalytic reactions. ChemComm.; 51(43):8916-9, Apr. 16, 2015.

Mackley et al., Heat Transfer and Associated Energy Dissipation for Oscillatory Flow in Baffled Tubes. Chemical Engineering Science. 1995; 50(14):2211-24.

Mignard et al., Determination of breakage rates of oil droplets in a continuous oscillatory baffled tube. Chemical Engineering Science. 2006; 61:6902-17.

Zheng et al., The axial dispersion performance of an oscillatory flow meso-reactor with relevance to continuous flow operation. Chemical Engineering Science. 2008; 63:1788-99.

International Preliminary Report on Patentability dated Mar. 1, 2018 in connection with International Application No. PCT/US2016/046749.

MULTI-PHASE OSCILLATORY FLOW REACTOR

RELATED APPLICATIONS

This Application claims the benefit under 35 U.S.C. § 119(e) of U.S. Provisional Application Ser. No. 62/205,088, entitled "MULTI-PHASE OSCILLATORY FLOW REACTOR" filed on Aug. 14, 2015, which is herein incorporated by reference in its entirety.

FEDERALLY SPONSORED RESEARCH

This invention was made using Government support under Grant No. ECCS-1449291 awarded by the National Science Foundation. The Government has certain rights in the invention.

FIELD

Embodiments of the present invention generally relate to an oscillatory flow reactor and methods of using such a reactor.

BACKGROUND

Various multi-phase small scale strategies have been developed as an alternative to batch scale screening approaches due to their enhanced mass and heat transfer characteristics, safety and controllability, and efficiency in reagent usage.

SUMMARY

According to one aspect, an oscillatory flow reactor includes a sample port, a carrier phase port, and a tubing having a centerline running through a lumen of the tubing from a first end of the tubing to a second end of the tubing. The tubing is curved such that an imaginary straight line intersects with the centerline at least twice such that at least two portions of the tubing are aligned and observable with a single optical port.

According to another aspect, a method of using an oscillatory flow reactor includes injecting an aqueous droplet into a tubing. The tubing has an inner surface comprising a fluoropolymer. The method also includes injecting an organic substance droplet into the tubing, and producing oscillatory flow of the aqueous droplet and the organic substance droplet through application of alternating pressure to the tubing such that the aqueous droplet moves through organic substance droplet with each oscillation.

According to yet another aspect, an oscillatory flow reactor includes a tubing having an inner surface comprising a fluoropolymer, such that an aqueous droplet moves through an organic substance droplet in the tubing during application of alternating pressure to the tubing. The oscillatory flow reactor also includes a housing supporting the tubing, a carrier phase port in fluid communication with the tubing, and a sample port in fluid communication with the tubing.

According to yet another aspect, a multiplexed oscillatory flow reactor arrangement includes a first reactor having a first tubing, a second reactor having a second tubing, and a pressure source. The arrangement also includes a first flow controller that opens and closes fluid communication between the pressure source and the first reactor and a second flow controller that opens and closes fluid communication between the pressure source and the first reactor. The arrangement also includes a multi-way selector valve adapted to guide a first droplet to the first reactor and a second droplet to the second reactor. The arrangement also includes one or more sensors which provide sample location feedback to the pressure source to control oscillatory motion of a sample based at least in part on sample location.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

Non-limiting embodiments that incorporate one or more aspects of the invention will be described by way of example with reference to the accompanying figures, which are schematic and are not necessarily intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
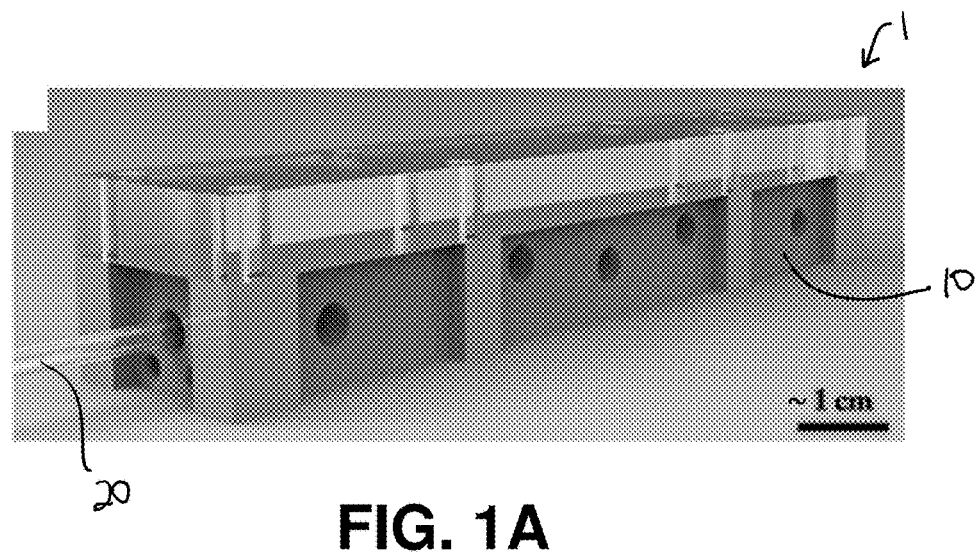
FIG. 1A is a perspective view of one embodiment of an oscillatory flow reactor having linear tubing.

Aspects of the invention are not limited in application to the details of construction and the arrangement of components set forth in the following description or illustrated in the drawings. Also, the phraseology and terminology used herein is for the purpose of description and should not be regarded as limiting.

The inventors have recognized several shortcomings associated with conventional continuous multi-phase flow small scale microreactor arrangements. Due to the constant length of the continuous multi-phase flow microreactor, the intrinsic dependence of the degree of mixing on residence times associated with continuous microscale platforms makes it challenging to reproduce the same mixing characteristics for different synthesis times. In addition, the use of a liquid as the immiscible carrier phase results in droplet-to-droplet communication through the lubrication films surrounding the dispersed phase, thereby altering the accuracy of the reagent concentrations in each droplet. These shortcomings of continuous multi-phase flow approaches have limited the utilization of flow chemistry platforms for studies of physical/chemical processes having processing times exceeding 10 minutes. Moreover, the in-flow addition of reagents into flowing droplets for multi-step chemical reactions has proved to be challenging due to the feedback effect of the in-line injections on the downstream flowrates. The challenges associated with in-line synchronization of the reagent injection into flowing droplets have limited the addressable parameter space of multi-step chemical reactions.

The inventors have recognized the need for a general flow-based technology which addresses the current challenges and shortcomings of continuous droplet flow techniques to achieve further progress in at least the pharmaceutical, materials and energy sectors.

According to some aspects, an automated droplet-based reactor utilizes oscillatory motion of a droplet in a tubular reactor under inert (e.g., argon) or reactive (e.g., oxygen) atmosphere to address current shortcomings of continuous multi-phase flow platforms. In some cases, the inventors have recognized that such an arrangement may provide or permit one or more beneficial characteristics, such as:

1. The use of integrated optical probes within the inlet and outlet of the oscillatory flow reactor enables robust, reproducible and fully automated motion of the droplet within the reactor without over/under shooting.
2. The oscillatory motion of the droplet removes the residence time limitation associated with continuous multi-phase flow platforms, without restricting the linear flow rate.
3. The oscillatory flow reactor enables in-situ single-point spectral characterization of the solute concentration within the droplet (microreaction vessel) at the process temperature, without the need for setup manipulation.
4. Separation of the mixing and residence times in the oscillatory flow reactor enables operation of distinct multi-step chemical processes with different characteristic time-scales within the same reactor.
5. The oscillatory flow reactor includes a housing that holds a removable tubing that can be removed and replaced with a tubing of a different material to enable material selection that is suitable for the desired application (e.g., having suitable surface properties).
6. Pressurization of void space external to the capillary enables elimination of the pressure differential inside and outside of the capillary to reduce gas permeation across capillary walls.

Overview

According to one aspect, the oscillatory flow reactor includes tubing having a defined first end and a second end, such that the tubing does not form a continuous closed circuit. In such an arrangement, a sample moves back and forth in the tubing alternating toward each end instead of continuously moving along one direction. In some embodiments, this oscillatory motion of the sample inside the tubing may be controlled by one or more pressure sources that are in fluid communication with the tubing. One or more flow controllers may open and close fluid communication between the tubing and the one or more pressure sources.

The reactor may have one or more sensors providing sample location feedback to the pressure source(s) to control the motion of the sample based at least in part on sample location. For example, a sensor may detect that the sample is approaching one end of the tubing, and may send a signal to a pressure source to input pressure into that end of the tubing, causing the sample to move back toward the other opposing end of the tubing.

The sensor may be a photodetector, a flow meter or any other suitable sensor. In some embodiments, where the sensor is a photodetector, each photodetector is paired with a corresponding light source. The tubing may be positioned between the light source and the photodetector. Examples of light sources include LEDs, optical fibers, lasers, ultraviolet-visible lamps (e.g., deuterium, tungsten halogen), incandescent bulbs, or any other suitable light source. The pressure source may be a pump such as a syringe pump, a suction pump, a vacuum pump, or any other suitable pressure source.

Each of these aforementioned components of the reactor may be supported by the housing.

The tubing may be connected to various components depending on the particular application of the reactor. For example, the tubing may connect to a source providing an inert atmosphere (e.g., argon). Other examples of components that may connect to the tubing include: a reagent/sample source, a selector valve, a high performance liquid chromatography (HPLC) or liquid chromatography-mass spectrometry (LC-MS) unit, one or more valves, or any other suitable component depending on the desired application.

According to one aspect, the material of the tubing may be important for facilitating measurement and/or testing. In some cases, the inner material of the tubing may create a difference between the surface energies of two liquid substances being moved through the tubing in order to enable measurement and/or testing. For example, the inner surface of the tubing may be made from a material that creates a difference between the surface energies of an aqueous phase and an organic phase that enables time-resolved in-situ spectral characterization of the organic substance within each phase without additional phase separation. As will be discussed in an example, taking advantage of the difference between the surface energies of aqueous and organic solvents on the inner surface of the tubing, a fully automated small-scale strategy may be used based on gas-driven oscillatory motion of a bi-phasic slug for high-throughput in-situ measurement and screening of partition coefficients of organic substances between aqueous and organic phases.

In some embodiments, for example, the tubing may be made from fluoropolymers, including amorphous fluoropolymers, such as, PTFE (polytetrafluoroethylene), FEP (fluorinated ethylene propylene), PFA (perfluoroalkoxy polymer resin), any TEFLON polymer, glass, fused silica, or other suitable material. In some embodiments, the inner surface of the tubing is made of any one of these materials or any other suitable material. In some embodiments, the tubing is transparent or translucent. In some embodiments, the tubing is flexible, and has favorable wetting properties (i.e., hydrophobic).

In one embodiment, an oscillatory flow reactor comprises a tubing having an inner surface comprising a fluoropolymer, such that an aqueous droplet moves through an organic substance droplet in the tubing during application of alternating pressure to the tubing, a housing supporting the tubing, a carrier phase port in fluid communication with the tubing and a sample port in fluid communication with the tubing. The tubing may be transparent or translucent. The tubing may be flexible, and have favorable wetting properties (i.e., hydrophobic).

In some embodiments, the housing may hold one or more heaters and/or coolers that adjust the temperature of the substance(s) flowing through the tubing to a desired temperature depending on the particular application of the reactor. The housing may also support or otherwise connect with other components, including measurement instruments such as, but not limited to, a thermocouple or other temperature measurement instrument. In some embodiments, the housing may include an inlet for receiving a gas such as nitrogen.

According to one aspect, the length of the tubing may be chosen to allow a droplet to reach a constant velocity. In some embodiments, the reactor arrangement includes a first sensor positioned at one portion of the tubing and a second sensor positioned at another portion of the tubing. For example, in one embodiment, a light source and photodetector are positioned at the first portion of the tubing and a second light source and photodetector are located at the second portion of the tubing. In some embodiments, the length along the tubing from the first sensor to the second sensor (as opposed to the distance between the first and second sensors) is 12 cm. For example, if the tubing is curved, the length along the tubing from the first sensor to the second sensor is the length defined by measuring from the first sensor to the second sensor, following along the tubing. As such, if the tubing is curved, the actual distance from the first sensor to the second sensor will be shorter than the length along the tubing from the first sensor to the second sensor. If the tubing is straight, the actual distance from the first sensor to the second sensor will be the same as the length along the tubing from the first sensor to the second sensor.

The length along the tubing from the first sensor to the second sensor may be any other suitable length depending on the desired application and volume, e.g., 10-12 cm, 10-15 cm, 10-20 cm, etc.

Figure 3:
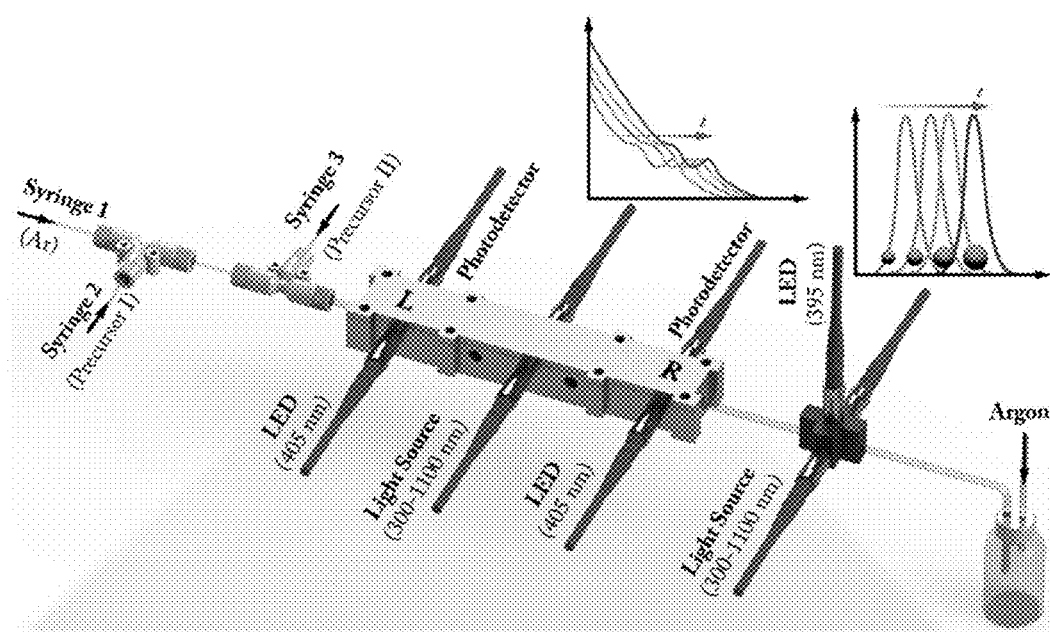
FIG. 3 is a perspective view of one arrangement of an oscillatory flow reactor used for growth and characterization of semiconductor nanocrystals.

One embodiment of an automated oscillatory flow reactor, shown in FIG. 3, consists of a 12 cm long tubular reactor (e.g., 0.0625 inch inner diameter made of, e.g., FEP, PTFE or PFA) embedded within a custom-machined aluminum chuck housing, two fiber-coupled LEDs and photodetectors, as well as a fiber-coupled UV-Vis light source and a miniature spectrometer. Four cartridge heaters, which may be embedded within the aluminum chuck housing (two on each side) in combination with a thermocouple embedded in the aluminum chuck, are used for heating the reactor. Three computer-controlled syringe pumps may be used to prepare the droplet with the desired composition under inert atmosphere (e.g., argon) and to control its oscillation within the heated zone of the reactor.

Linear Tubing

Figure 1B:
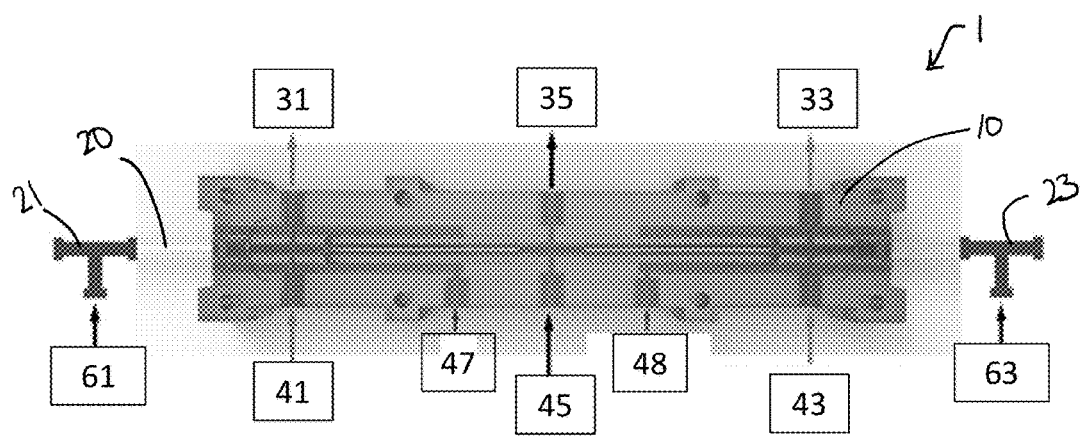
FIG. 1B is a top view of the reactor shown in FIG. 1A.

A first illustrative embodiment of an oscillatory flow reactor is shown in FIGS. 1A-1B. The reactor includes tubing 20 that runs through a housing 10. The reactor also has a first light source 41 paired with a corresponding first photodetector 31 and a second light source 43 paired with a corresponding second photo detector 33. The first light source and photodetector pair 31, 41 may be positioned near a first end of the tubing 20, and the second light source and photodetector pair 33, 43 may be positioned near a second end of the tubing. As discussed above, the first and second pairs of light sources and photodetectors may serve as triggers for switching the flow direction in the tubing.

A third light source 45 and corresponding photodetector 35 may be positioned between these two pairs of photodetectors and light sources. The third light source and photodetector pair may serve as a spectral characterization point. In some embodiments, the third photodetector 35 is positioned at the midpoint between the two light source and photodetector pairs, and may be, in some cases, at the centerpoint along the length of the reactor.

In some embodiments, the light sources 41 and 43 are LEDs, and may be, in some cases, blue LEDs having a wavelength of 405 nm. The third light source 45 may be a fiber coupled light source. In some embodiments, the third photodetector 35 is a spectrometer, and may be fiber coupled.

In some embodiments, the housing supports or otherwise connects with a thermocouple 48. The housing also includes an inlet for receiving a gas 47 such as nitrogen.

The ends of tubing 20 may be connected to other components 61, 63, depending on the desired application. In some embodiments, fittings 21, 23 are attached to the ends of the tubing to connect the tubing to other components. In some embodiments, the fittings are T-junctions or otherwise have a plurality of pathways to permit the attachment of multiple components to the tubing ends.

Curved Tubing

According to one aspect, in some embodiments of the oscillatory flow reactor, the arrangement uses only one optical port which serves both as the trigger for switching the flow direction and as the spectral characterization point. This arrangement may be accomplished by having tubing that is curved such that at least two portions of the tubing are aligned and observable with a single optical port. A photodetector that is also aligned with the two aligned portions of the tubing is able to detect activity occurring in both portions of the tubing. Said another way, the tubing has a centerline 29 that runs through the lumen of the tubing from one end of the tubing to the other end. The tubing is curved in such a way that an imaginary straight line 39 will intersect with the tubing centerline at least twice. A detector having an optical path directed along that imaginary straight line is able to detect activity occurring at each intersection point. In some embodiments, the imaginary straight line intersecting with the tubing centerline at least twice is substantially perpendicular to the tubing centerline (e.g., plus or minus about 5, 6, 7, 8, 9 or 10 degrees).

As illustrative examples, the tubing may be curved in a horseshoe shape, U-shape, elongated U-shape, or any other suitable curved shape.

Figure 2A:
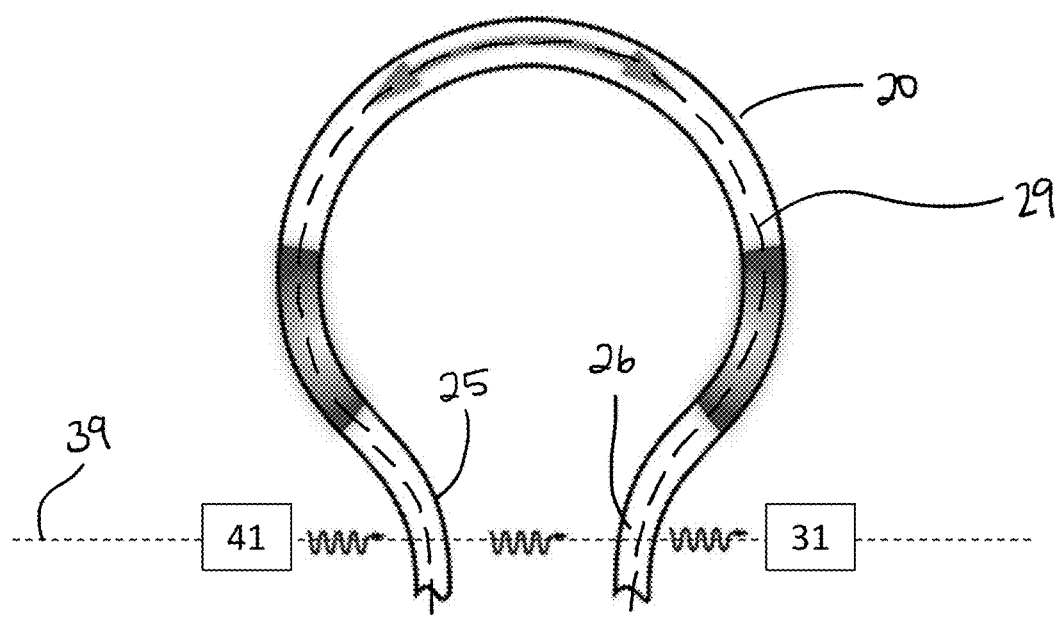
FIG. 2A is a schematic of one embodiment of an oscillatory flow reactor having curved tubing.
Figure 2B:
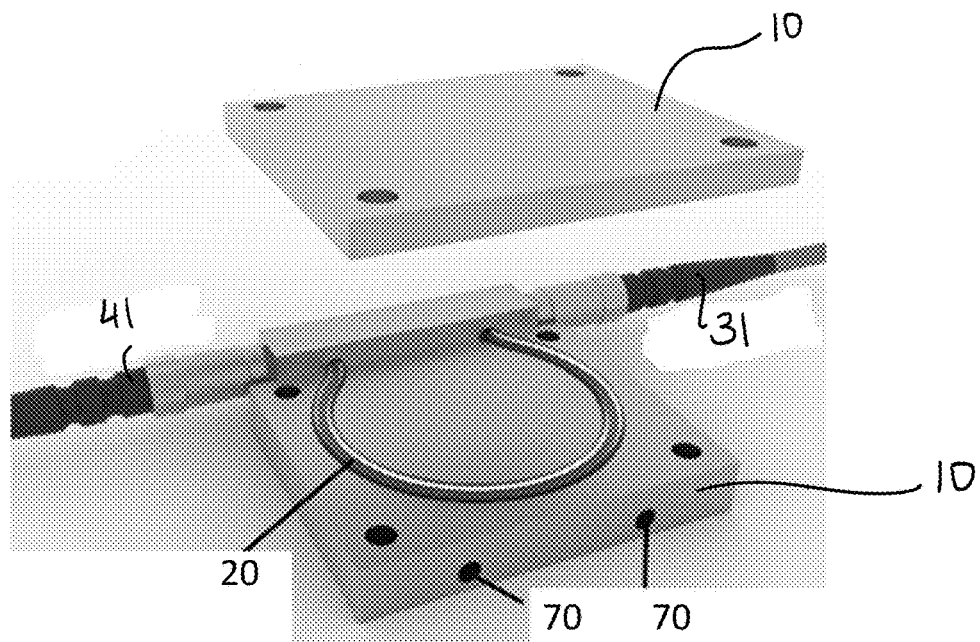
FIG. 2B is a perspective view of an oscillatory flow reactor having curved tubing.

An illustrative embodiment of an oscillatory flow reactor is shown in FIGS. 2A-2B. The reactor has a curved tubing 20. First and second portions 25, 26 of the tubing are aligned with one another and are also aligned with a light source 41 and photo detector 31. The light source and photodetector combine to form an optical port that serves as both the trigger for switching the flow direction and as the spectral characterization point.

As seen in FIG. 2B, in some embodiments, the housing 10 that holds the tubing 20 may include heaters 70.

Applications

In some cases, the small reagent volume (e.g., 5-20 µL) required for each reaction condition in the oscillatory flow reactor and the ability to provide similar mixing behavior to a batch system make the oscillatory flow reactor ideal for use in many different applications, such as high-throughput library development, screening, and optimization of a wide range of physical/chemical processes including bi-phasic catalytic reactions, colloidal nanomaterial synthesis, liquid-liquid extraction, and partition coefficient measurement of organic substances. As illustrative examples, four specific applications of the oscillatory flow reactor will now be discussed.

Example 1—Screening of Semiconductor Nanocrystals (Quantum Dots)

As a first example, an oscillatory flow reactor may be used for high-throughput in-situ screening of semiconductor nanocrystals (also known as quantum dots or "QD"). The emergence of QDs, with their unique physicochemical properties, have enabled breakthrough applications at the cellular and organism levels in biological imaging, and at the device level in light emitting diodes, solar cells and displays. Owing to the quantized energy levels associated with nanometer-sized QDs, their corresponding absorption and photoluminescence emission spectra are directly correlated and tuned with the size of QDs.

The inventors have recognized that, with conventional QD preparation processes, the lack of control over the experimental parameters and unavailability of spectral information during intermediate growth stages of nanocrystals have inhibited the development and optimization of III-V QDs. The inventors have also recognized that the manual nature of batch scale techniques makes high-throughput screening and fundamental studies of colloidal QDs both time- and labor-intensive.

An automated two-phase small scale platform based on controlled oscillatory motion of a droplet within a tubular reactor may be used for high-throughput in-situ studies of solution-phase preparation of semiconductor nanocrystals. The oscillatory motion of the droplet within the heated region of the reactor may enable temporal single-point spectral characterization of the same nanocrystals with a time resolution of, for example, three seconds over the course of the synthesis time without sampling, while removing the residence time limitation associated with continuous flow-based strategies. The developed oscillatory microprocessor may allow for direct comparison of the high temperature and room temperature spectral characteristics of nanocrystals.

This automated strategy may enable the study of the effect of temperature on the nucleation and growth of II-VI and III-V semiconductor nanocrystals. The automated droplet preparation and injection of the precursors combined with the oscillatory flow technique allows 7500 spectral data, within a parameter space of 10 minute reaction time, 10 different temperatures and 5 different precursor ratios, to be obtained automatically using 250 µL of each precursor solution.

The oscillatory microprocessor platform may provide real-time in-situ spectral information at the synthesis temperature, which can be useful for fundamental studies of different mechanisms involved during the nucleation and growth stages of different types of nanomaterials.

One embodiment of an automated oscillatory flow reactor, shown in FIG. 3, consists of a 12 cm long tubular reactor (e.g., 0.0625 inch inner diameter, made of fluorinated ethylene propylene, FEP) embedded within a custom-machined aluminum chuck housing, two fiber-coupled LEDs and photodetectors, as well as a fiber-coupled UV-Vis light source and a miniature spectrometer. Four cartridge heaters, which may be embedded within the aluminum chuck housing (two on each side) in combination with a thermocouple embedded in the aluminum chuck, are used for heating the reactor. Three computer-controlled syringe pumps may be used to prepare the droplet with the desired molar ratio under inert atmosphere (e.g., argon) and to control its oscillation within the heated zone of the reactor.

An illustrative example of one process will now be described. First, a 5-10 µL droplet containing precursor I is formed at the first T-junction and automatically moved toward the second T-junction using syringe 1 (e.g., which may inject pressurized argon at 10 psig). In the next step, using the tubing volume between the two T-junctions, the second precursor (5-10 µL) is automatically injected into the droplet of precursor 1 at the second T-junction. The prepared droplet is then moved into the heated zone (160° C.-220° C.) of the reactor using syringe 1 and oscillated back and forth between the two integrated fibers located at each end of the reactor for the pre-defined reaction time and at a set flow velocity.

Figure 5:
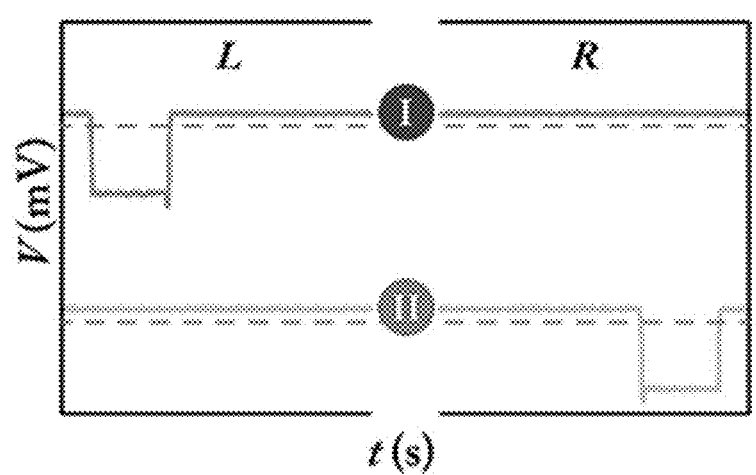
FIG. 5 depicts a graph of measured voltages of the two photodetectors placed on the left (L) and right (R) sides of the housing at times (I) and (II) highlighted in FIG. 4.

The change in the measured voltage of the photodetectors, shown in FIG. 5, is used as a threshold criterion to automatically switch the flow direction of syringe 1 (e.g., using LabVIEW), and thereby oscillating the droplet within the heated zone of the reactor.

The overall process flow including the droplet formation, injection of precursor II into the previously formed droplet of precursor I, and in-situ absorption spectra data acquisition may be computer-controlled, e.g., via LabVIEW scripts.

The constant oscillatory motion may help to ensure well-stirred mixing inside the droplet, owing, in some cases, at least in part to the two recirculation zones formed inside the droplet as in traditional segmented flow.

In some cases, the automated oscillatory motion of the droplet within the reactor may remove one, two or three of the following limitations of continuous multi-phase platforms: (a) inter-relation of mixing characteristics and residence time, (b) residence time limitation due to a constant tubing length and (c) lack of in-situ characterization of individual droplets for multiple residence times.

In contrast to continuous multi-phase strategies, the oscillatory microprocessor may allow utilization of the same flow velocity, thereby providing the same degree of mixing for different growth times and enabling single-point measurement of the same micro-reaction vessel without the need to adjust the flow velocity or the reactor length. Increasing the flow velocity or decreasing the reactor length will linearly decrease the time required for the droplet to complete each path inside the oscillatory zone, thereby decreasing the time-delay between each absorption measurement. However, as previously demonstrated in the field, the minimum required travel distance for a liquid droplet to form a complete recirculation (stirring) is three times of the total length of the liquid droplet (i.e., the minimum reactor length of ~3 cm for a 20 µL droplet).

Taking into account the minimum travel length of a droplet, as well as the time required to switch the flow direction of the carrier syringe pump (syringe 1 in FIG. 3) at each end of the oscillatory zone, and the time required for the droplet to reach a constant velocity, a total oscillatory flow reactor length of 12 cm from the left to the right side fiber-coupled LEDs was selected to cover a wide range of droplet volumes (5-30 µL). Utilization of an inert gas (e.g. argon) as the carrier phase may remove the need for finding a solvent with negligible miscibility with the QD solvent (e.g., octadecene) at high temperatures. The integration of the two-phase oscillatory platform with spectral characterization tools (i.e., absorption and fluorescence spectroscopy) enables real-time in-situ monitoring of the in-flow prepared QDs with a time resolution of 3 seconds, which may be otherwise difficult to accomplish in batch scale synthesis (limited to tens of seconds). A flow-cell located downstream of the reactor may be used for direct comparison of the high temperature to room temperature absorbance of the same semiconductor nanocrystals. A third fiber port (which may be perpendicular to the miniature spectrometer fiber) within the same flow-cell may enable in-line photoluminescence, PL, measurement of the in-flow prepared QDs.

Figure 4:
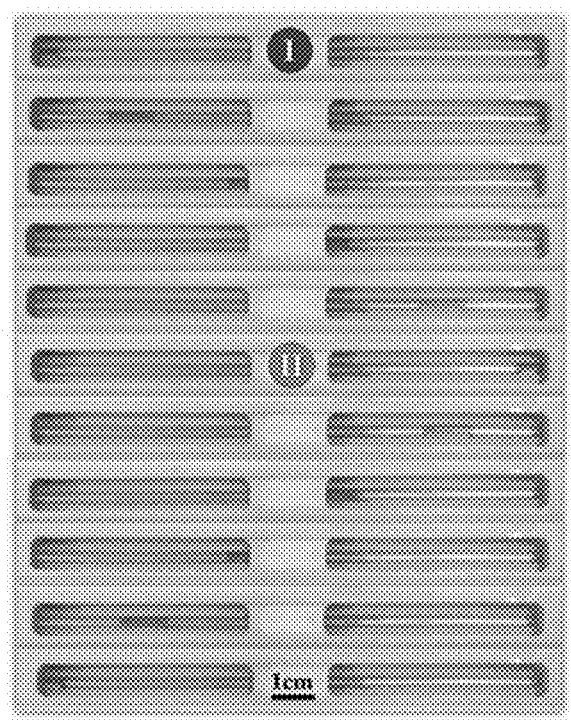
FIG. 4 depicts time-series of bright-field images of one complete oscillation cycle of a droplet within the reactor of FIG. 3.

FIG. 4 depicts a time-series of bright-field images of one complete oscillation cycle of a droplet within the reactor. FIG. 5, as discussed above, depicts measured voltages of the two photodetectors placed on the left, L, and right, R, sides of the aluminum chuck at times (I) and (II) highlighted in FIG. 4. The dashed line shows the threshold voltage used for switching the flow direction of the carrier syringe.

Example 2—Studying the Ligand Exchange Process of Colloidal QDs

As a second example, an oscillatory flow reactor may be used for real-time in-situ studies of the ligand exchange process of colloidal QDs tuned for a desired application (e.g., solar cells or biomedical imaging). For the synthesis of colloidal QDs, ligands are specifically chosen to tune the conversion of formed monomers into nanocrystals with desired shape, size, and functionality. It has previously been demonstrated that organic ligands with long hydrocarbon chains (e.g., oleic acid or trioctylphosphine) can achieve the desired level of control during the colloidal synthesis of QDs. However, the final applications of colloidal QDs (e.g., biomedical or photovoltaics) usually require a capping ligand with a different functionality (e.g., water soluble, or smaller QD-to-QD distance).

Figure 6A:
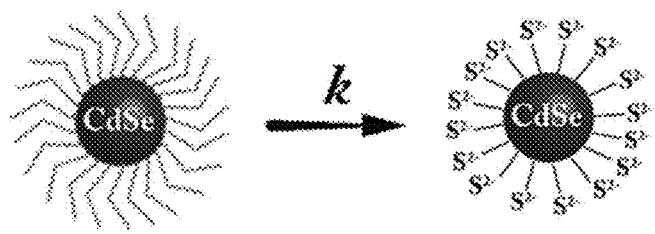
FIG. 6A depicts a schematic of a ligand exchange process for solar cell applications.

The application-driven demand for a different capping ligand requires ligand exchange after conventional colloidal synthesis of QDs using organic ligands. FIG. 6A depicts the ligand exchange process of CdSe QDs from organic ligands (oleic acid) to inorganic ligands (sulfur ions) for solar cell applications. The ligand exchange process expands the functionality of QDs by enabling replacement of original organic ligands (selected for the synthesis) by the application-specific molecule, including inorganic ions and polymers.

The inventors have recognized that understanding the fundamentals of the ligand exchange reactions and the associated kinetics of this process would enable the design of next generation inorganic ligands for solid-state devices and photovoltaics applications, as well as biomedical applications (e.g., in-vivo bio-imaging).

Figure 6B:
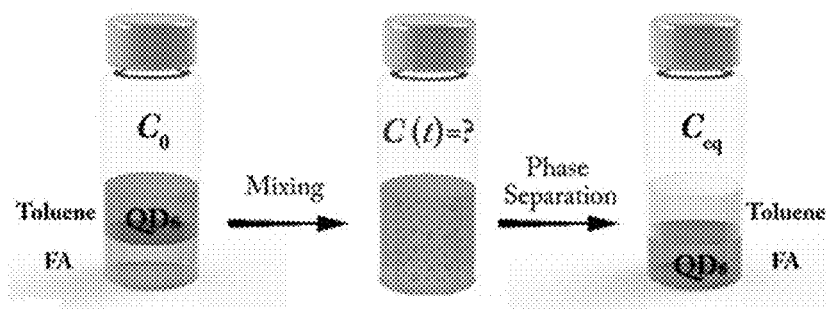
FIG. 6B depicts a schematic of a batch scale ligand exchange process involving two immiscible fluids.

The inventors have appreciated that the formation of micro-emulsions during the ligand-exchange process involving two immiscible phases, along with the time required for the separation of the two immiscible fluids, makes the in-situ (or offline using manual sampling) characterization of the exchange of the capping ligands challenging, and in some cases (fast kinetics in the order of 1-3 min) even impossible using a conventional batch scale technique (FIG. 6B).

Figure 6C:
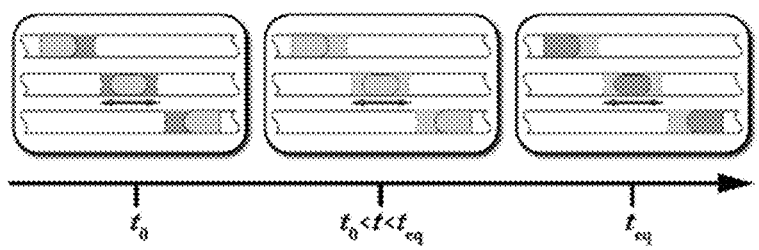
FIG. 6C depicts phase separation of the two immiscible fluids at each oscillation cycle in an oscillatory flow reactor.

In one illustrative example, an oscillatory flow reactor arrangement was used for real-time in-situ studies of the ligand exchange process of colloidal nanocrystals tuned for the desired application (e.g., solar cells or biomedical imaging). As seen in FIG. 6C, which is a schematic of an illustrative process using an oscillatory flow reactor, the surface-energy enabled phase separation of the two immiscible fluids at each oscillation cycle within the oscillatory multiphase flow reactor arrangement enables in-situ studies of the ligand exchange reaction for colloidal QDs.

Figure 7:
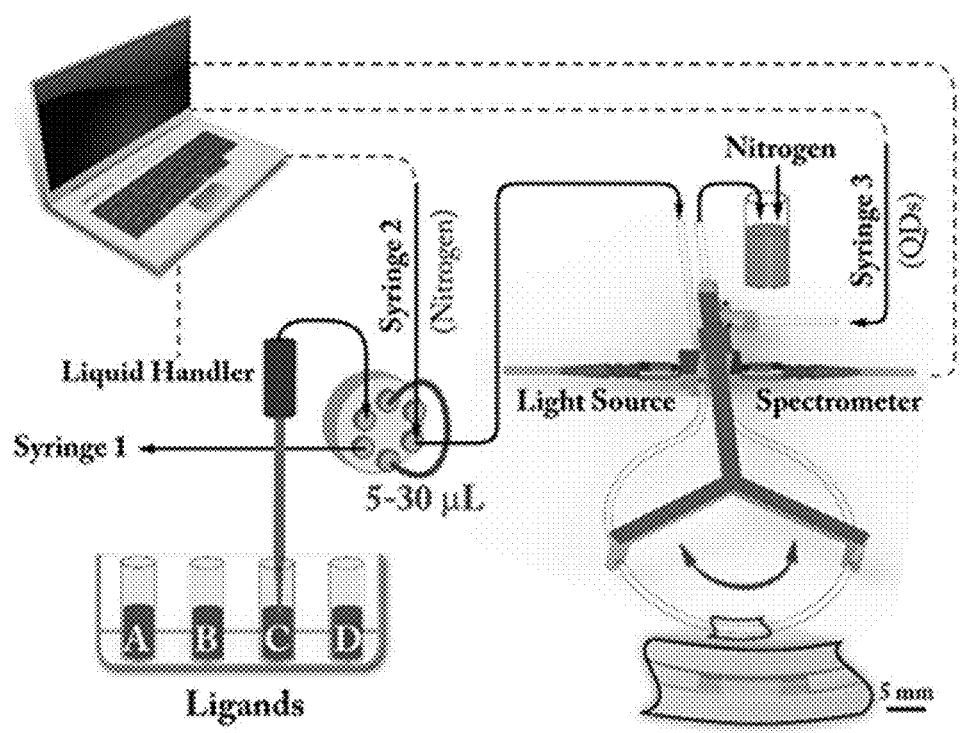
FIG. 7 depicts an automated oscillatory multiphase flow reactor arrangement for in-situ studies of quantum dot ligand exchange processes.

FIG. 7 depicts one illustrative embodiment of an oscillatory flow reactor arrangement, which includes a horseshoe-shaped tubing and a single-point optical detection as discussed previously, and a computer-controlled liquid handler (loaded with a wide range of ligands). The integrated fiber-coupled light source and UV-Vis spectrometer within the horseshoe oscillatory flow reactor enables in-situ optical characterization of the colloidal nanocrystals within each phase at each oscillation cycle. The same optical detection point was also used as the feedback device for automatic switching of the flow direction through a computer controlled syringe pump (e.g., via LabView).

Figure 8:
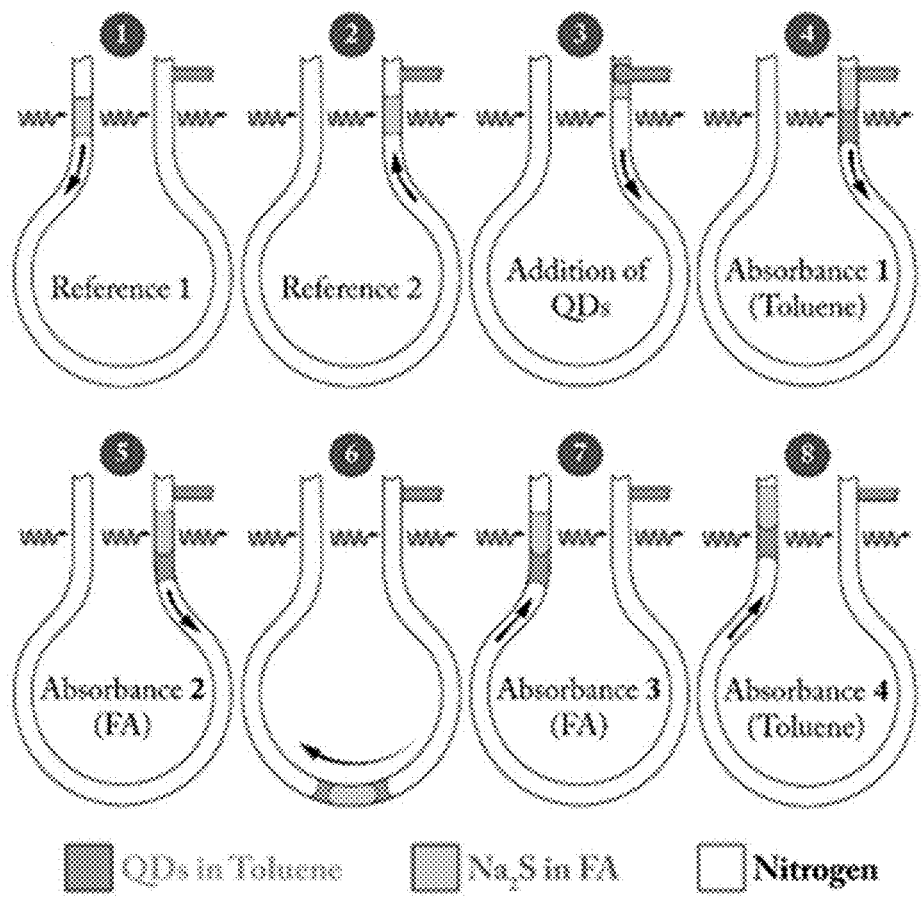
FIG. 8 depicts illustrations of different steps associated with injection of the organic phase containing QDs into the other immiscible fluid and the subsequent oscillatory motion of the bi-phasic slug within a reactor.

The oscillatory flow reactor was applied towards studies of the (1) ligand exchange of CdSe QDs from oleic acid (dissolved in toluene) to sulfur (dissolved in formamide); and (2) ligand exchange of CdSe QDs from oleic acid (dissolved in toluene) to cysteine (dissolved in phosphate buffered saline). FIG. 8 depicts an illustration of steps associated with injection of the organic phase containing QDs (darkest shade) into the other immiscible fluid (e.g., formamide) and the subsequent oscillatory motion of the bi-phasic slug within the tubular reactor.

Example 3—Measurement of Partition Coefficients

As a third example, an oscillatory flow reactor may be used for rapid in-situ partition coefficient measurements of drug molecules. A partition coefficient (sometimes known as a distribution coefficient) describes the hydrophilicity or hydrophobicity of a compound between two immiscible phases, and has a wide range of applications in the pharmaceutical industry (e.g., pharmacokinetics and pharmacodynamics) and environmental sciences (i.e., groundwater contamination). Conventionally, a partition coefficient is measured on a batch scale basis using the "shake-flask" method (using UV spectroscopy or HPLC for analysis), as shown in FIG. 6A.

The inventors have recognized that the large diffusion length scales associated with batch techniques necessitate the creation of micro-emulsions to promote mass transfer; in turn, the presence of these emulsions increases the time required for separation of the two immiscible phases after equilibrium, making the batch scale technique a time- and labor-intensive process. The inventors have also recognized that the manual batch scale technique is challenging to apply to partition coefficient measurements at physiologically-relevant temperatures (i.e., 37° C.).

Over the past decade, continuous microscale multi-phase strategies, owing to their enhanced heat and mass transfer characteristics, have been developed as an alternative route to batch scale multi-phase processes such as liquid-liquid extraction and screening of gas dissolution and solubility. Multi-phase microfluidics approaches have also been applied for measurement of partition coefficient between two immiscible phases. These microscale strategies have (i) used a microfluidic device as an efficient mixing method for "fast" equilibrium times and downstream phase separation and collection of each phase for manual measurements, (ii) utilized fluorescence microscopy for measurements of the extraction of a fluorescent molecule from one phase to another, or (iii) used gravity and as the method of shaking (mixing) and phase separation.

The inventors have recognized that, with these strategies, the phase separation process, downstream collection, and manual characterization of each phase makes the measurement a semi-batch process. In addition, the inventors have recognized that fluorescence microscopy limits the applicability of the measurement technique to fluorophore molecules. The inventors have appreciated that, these limitations, along with a constantly increasing need for rapid and accurate partition coefficient measurement of organic substances between two immiscible phases, necessitate the development of a fully automated small-scale process for in-situ measurement and screening of partition coefficient at the desired temperature.

As discussed previously, taking advantage of the difference between the surface energies of aqueous and organic solvents on a FEP (or, e.g., PTFE or PFA) substrate, a fully automated small-scale strategy may be used based on gas-driven oscillatory motion of a bi-phasic slug for high-throughput in-situ measurement and screening of partition coefficients of organic substances between aqueous and organic phases.

In one illustrative example, the oscillatory flow strategy enabled single partition coefficient data point measurement within 8 min (including the sample preparation time) which is 360 times faster than the conventional "shake-flask" method, while using less than 30 μL volume of the two phases and 9 nmol of the target organic substance. The developed multi-phase strategy was validated using a conventional shake-flask technique. The developed strategy was also extended to include automated screening of partition coefficients at physiological temperature.

Figure 9:
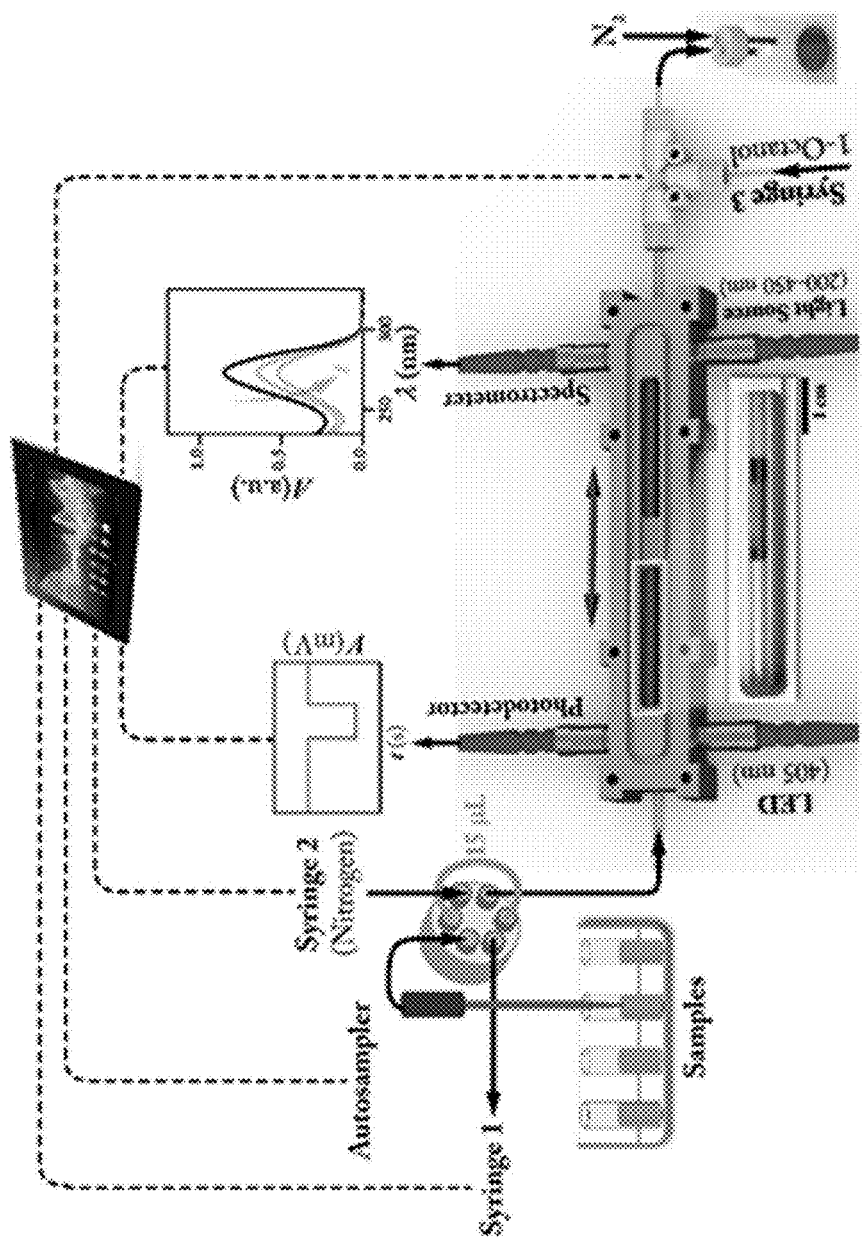
FIG. 9 depicts a schematic of one arrangement of an oscillatory flow reactor used for in-situ measurement of partition coefficient.

FIG. 9 depicts a schematic of an automated multi-phase oscillatory flow reactor arrangement for in-situ measurement of partition coefficient. Syringe 1 withdraws liquid from the sample vials and delivers into the sample loop. Syringe 2 delivers carrier phase, pre-filled with 10 psig nitrogen. Syringe 3 injects the organic phase (1-octanol) into the aqueous phase (DI Water) containing the organic substance.

Figure 10:
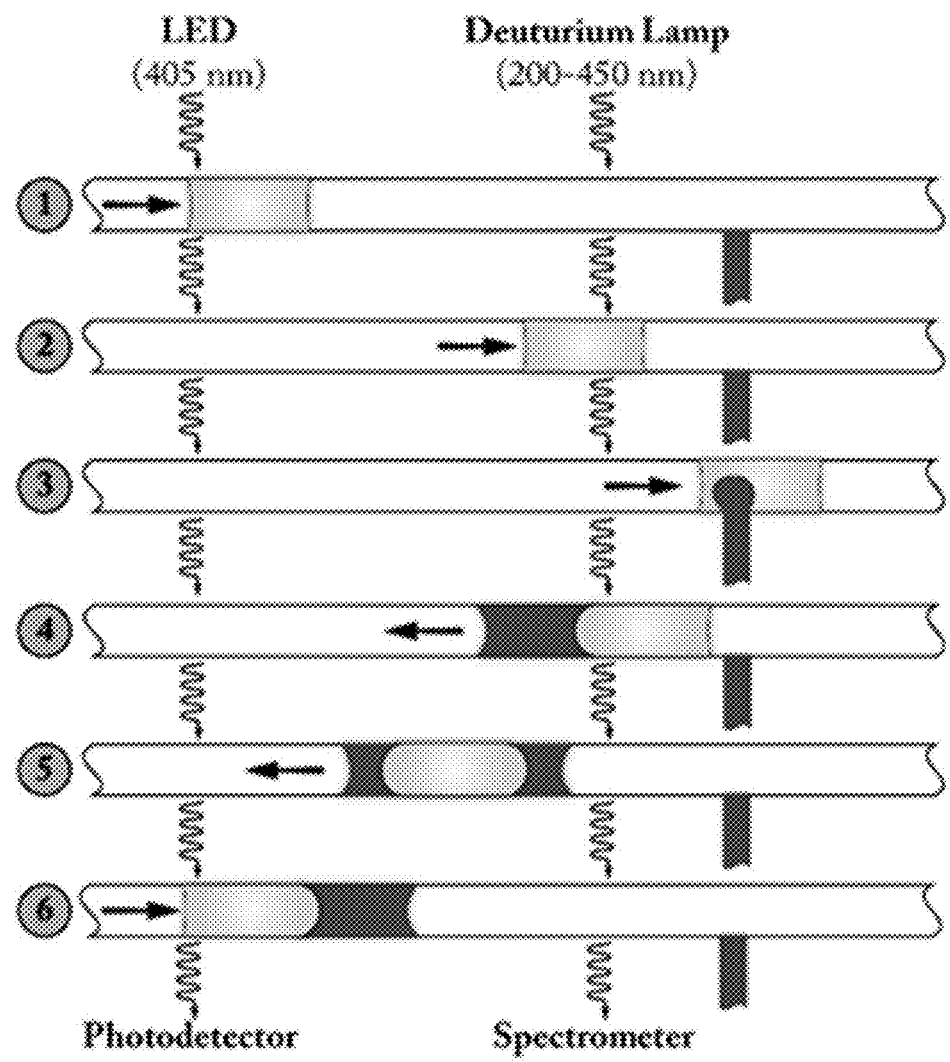
FIG. 10 depicts an illustration of different steps associated with injection of the organic phase into the aqueous phase and the subsequent oscillatory motion of the bi-phasic slug within the reactor.

FIG. 10 depicts an illustration of different steps associated with injection of the organic phase into the aqueous phase and the subsequent oscillatory motion of the bi-phasic slug within the tubular reactor. Using the difference between the surface energies of the aqueous and organic phases on a FEP (or, e.g., PTFE or PFA) substrate enables time-resolved in-situ spectral characterization of the organic substance within each phase without additional phase separation. In addition, the use of gas (e.g., nitrogen) as the carrier phase facilitates the oscillatory motion, which may remove the residence time limitation associated with continuous multi-phase microscale platforms. The oscillatory motion of the bi-phasic slug enables single-point spectral characterization of the bi-phasic slug during the transfer of the organic substance from the aqueous to the organic phase, as well as at the equilibrium state. While traditional techniques (with distinct mixing and measurement stages) often require assumptions about equilibration time, the system described herein can detect equilibration both quantitatively and automatically.

Figure 11:
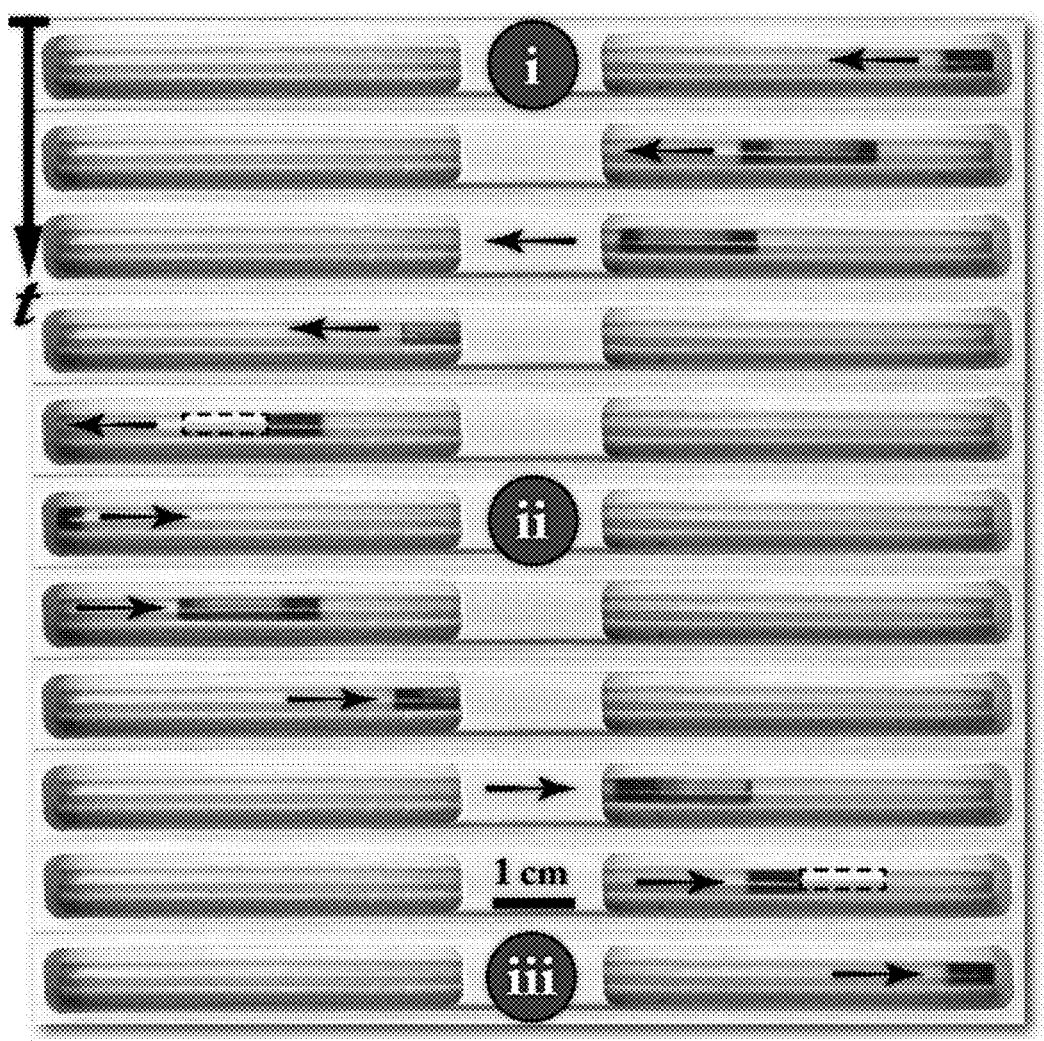
FIG. 11 is a bright-field snapshot time-series of the oscillatory motion of a bi-phasic slug along the reactor tubing.

As an illustrative example of one result, FIG. 11 depicts bright-field snapshot time-series of the oscillatory motion of a bi-phasic slug (DI water, 15 μL, and 1-octanol, 10 μL) along the FEP tubing embedded within the aluminum chuck. The organic phase (1-octanol) was labelled with Sudan red for better visualization. The dashed lines in frames 5 and 10 highlight the aqueous phase. In section (i) of FIG. 11, the UV absorption spectra of both phases are recorded and the flow direction is reversed. In section (ii), a change in the measured voltage of the fiber-coupled photodetector results in the detection of the bi-phasic slug, and the flow direction is reversed. Finally, in section (iii), completely separated aqueous and organic phases within the bi-phasic slug enter the UV spectral measurement point.

Example 4—Photoredox Catalysis

As a fourth example, an oscillatory flow reactor may be used for in-flow studies of visible-light photoredox catalysis. Over the past decade, visible-light photoredox catalysis using metal complexes (e.g., polypyridyl complexes of ruthenium and iridium) has steadily been developed as a promising strategy for sustainable and green synthesis of fine chemicals. The relatively long lifetime (~1 μs) associated with the photoexcited states of metal complexes may result in a bimolecular electron transfer pathway (chemical reaction) instead of deactivation. For instance, photoredox catalysis has successfully been employed for batch scale coupling reactions, reductive dehalogenation, and oxidative hydroxylation.

However, the inventors have appreciated that the inverse correlation of the reaction vessel size and penetration depth of the irradiated light has resulted in reaction times on the order of hours. The high surface area to volume ratio offered by microscale flow chemistry technologies has addressed the aforementioned limitation of batch scale photochemical reactors by reducing the characteristic reaction vessel length scale from tens of centimeters to hundreds of micrometers. Nevertheless, the inventors have recognized that the direct correlation of the mixing and residence times and limited range of residence times for a pre-defined reactor length in combination with the reagent volume required per reaction condition make it challenging to employ continuous flow chemistry approaches for high-throughput screening, characterization, optimization and library development of photoredox catalysis reactions.

Figure 12:
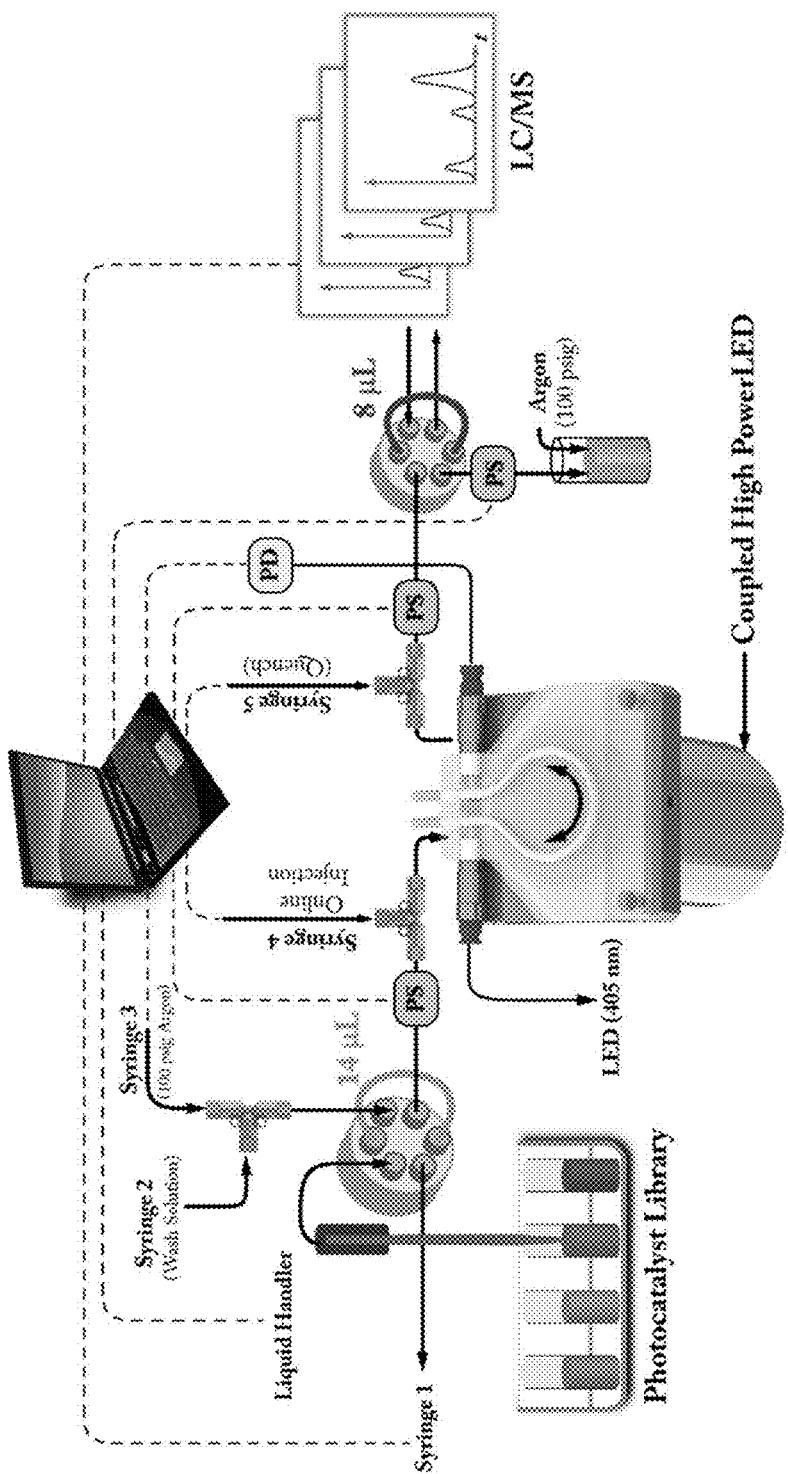
FIG. 12 depicts a schematic of one arrangement of an oscillatory flow reactor used for in-flow studies of visible-light photoredox catalysis.
Figure 13:
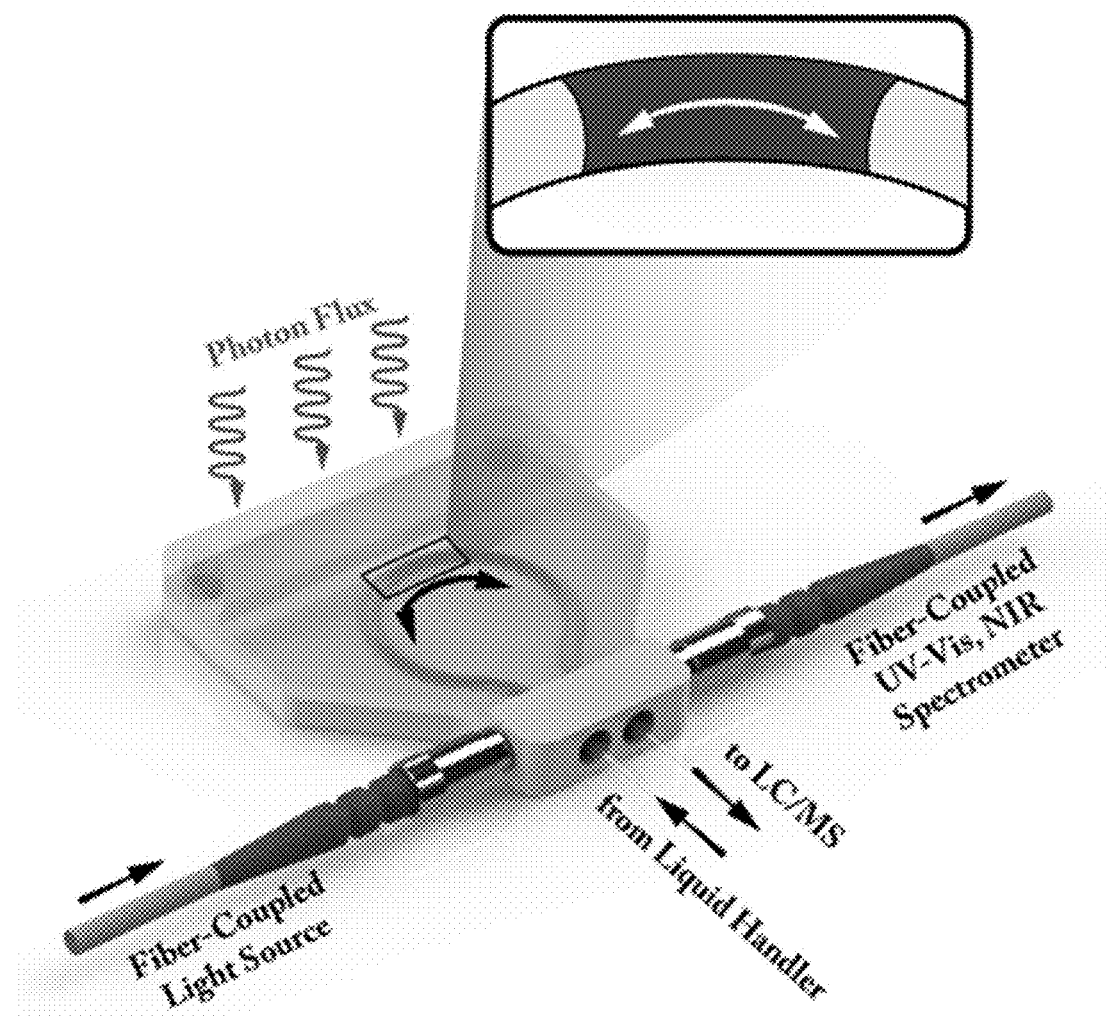
FIG. 13 depicts a closer view of the horseshoe-shaped oscillatory flow reactor.
Figure 14:
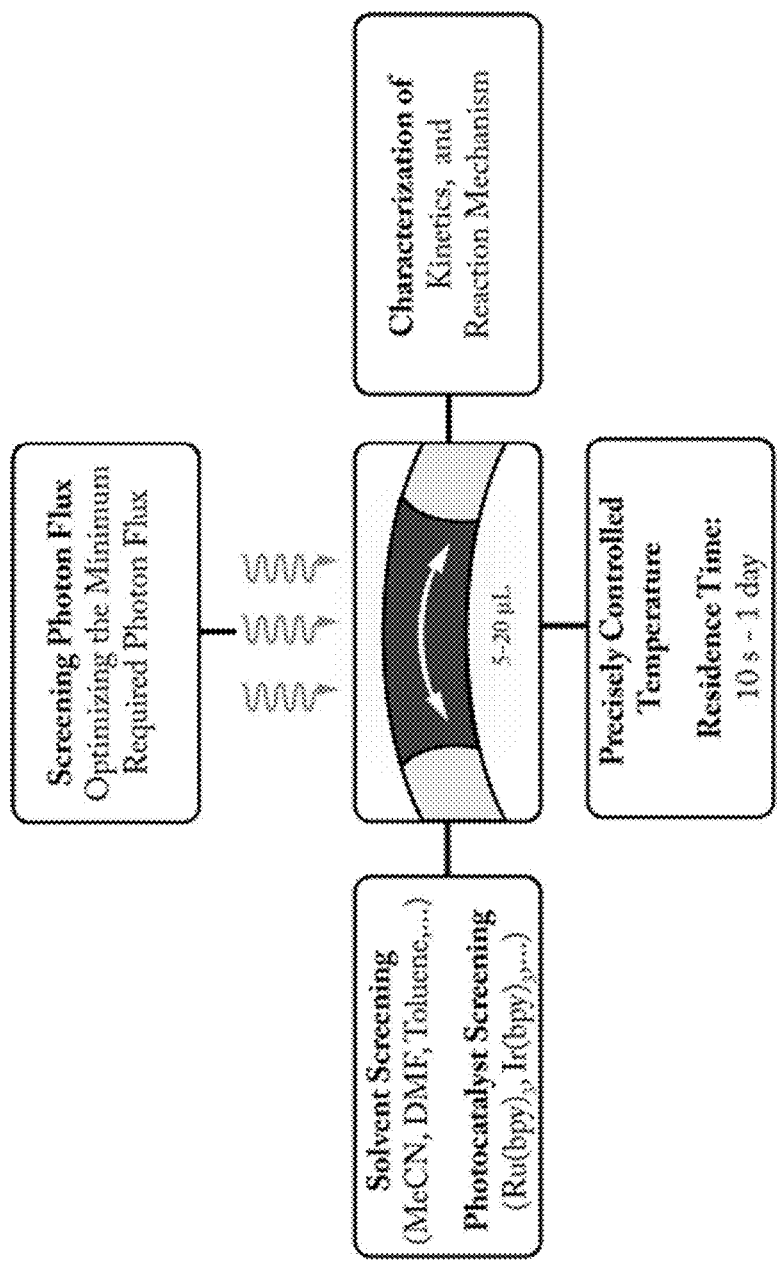
FIG. 14 summarizes some advantages/capabilities of the reactor arrangement of FIG. 12.

FIG. 12 shows one illustrative example of an oscillatory flow reactor arrangement used as a microscale photochemistry platform for in-flow studies of visible-light photoredox catalysis. This arrangement capitalizes on the removed residence time limitation and enhanced mixing and mass transfer advantages of oscillatory flow strategy. The position of the formed droplet (micro-reaction vessel) at the inlet and outlet of the oscillatory flow reactor is detected through a single-point optical detection, integrated within a custom-machined aluminum chuck housing. The optical feedback provided through the single-point position detection allows for automated switching of the flow direction of the carrier phase to ensure the droplet is always under the same irradiation intensity over the course of the photoredox catalysis process. FIG. 13 depicts a closer view of the horseshoe oscillatory flow reactor, and FIG. 14 summarizes some advantages/capabilities of the reactor arrangement.

Figure 15:
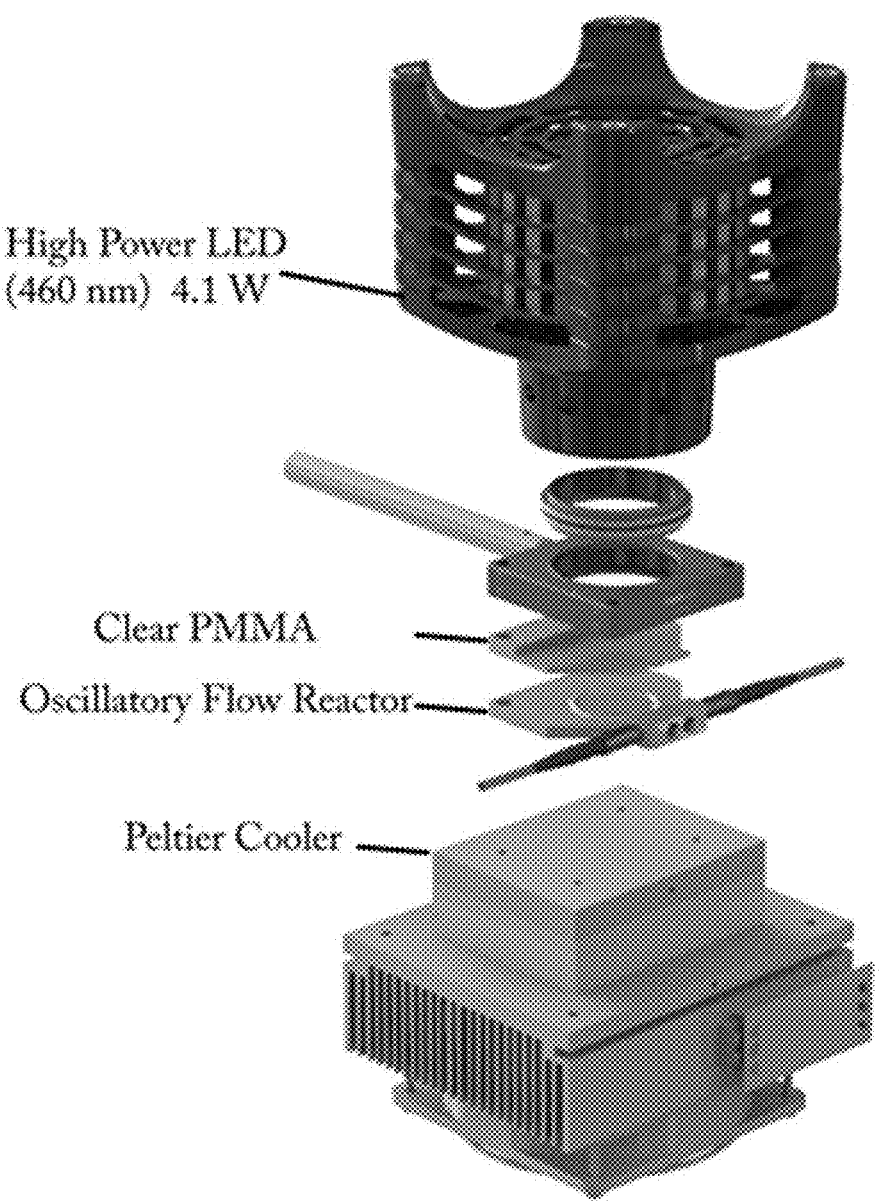
FIG. 15 depicts an exploded view of the reactor integrated with a high power LED and a peltier cooler.

Such an arrangement may allow for the effect of irradiation light intensity on the yield (obtained using in-flow LC-MS) and selectivity of the photoredox catalysis to be precisely characterized by automatic tuning of the irradiation power of the high power LED (e.g., through LabView). FIG. 15 depicts an exploded view of the reactor integrated with a high power LED and a peltier cooler. In addition, utilizing gas as the carrier phase in both sides of a droplet that is pre-formed via a computer-controlled liquid handler (containing the desired photocatalyst) provided sufficient gas molecules during the photoredox catalysis using a reactive gas as an oxidant (e.g., oxygen).

Figures 16A, 16B, 16C:
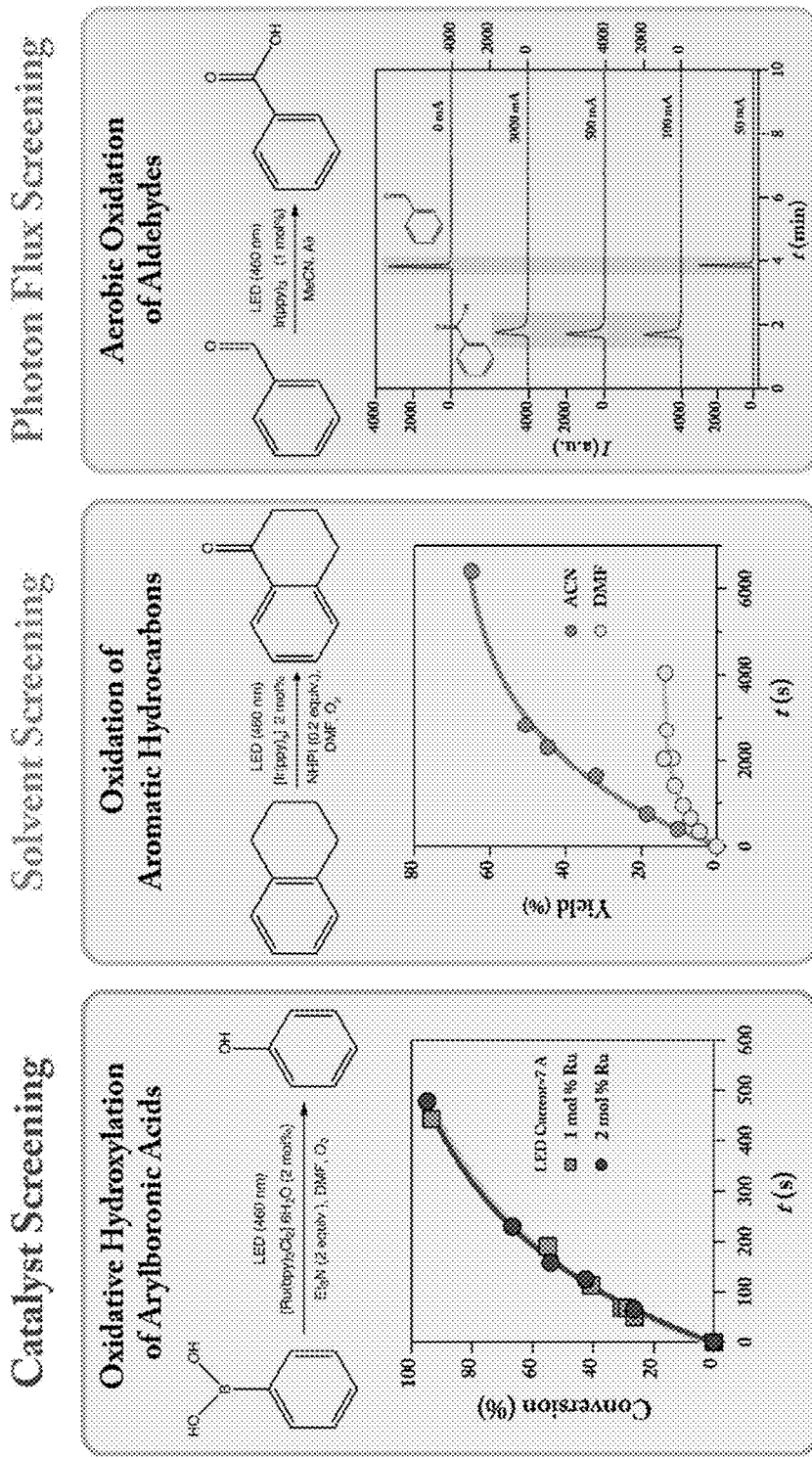
FIG. 16A summarizes the effect of catalyst loading and time on the photoredox catalysis.
FIG. 16B summarizes the effect of solvent selection and time on the photoredox catalysis.
FIG. 16C summarizes the effect of photon flux on the photoredox catalysis.

Through adjusting the pressure of the carrier phase, the effect of gas concentration (e.g., oxygen pressure) on the photoredox catalysis (e.g., oxidative hydroxylation of phenylboronic acids) could be studied. FIG. 16A summarizes a study investigating the effect of catalyst loading on oxidative hydroxylation of arylboronic acids. FIG. 16B summarizes a study investigating the effect of solvent on oxidation of aromatic hydrocarbons. Finally, FIG. 16B summarizes a study obtaining the minimum required photon flux for aerobic oxidation of aldehydes.

Such an arrangement may enable material efficient high-throughput screening and optimization of continuous (e.g., reaction time and concentration of the photocatalyst) and discrete (e.g., different metal complexes, and reaction solvents) parameters associated with a photoredox catalysis process using only, for example, 20 µL volume of the solution mixture per experimental condition. The obtained optimized parameters (e.g., photocatalyst molecule structure, concentration, solvent, irradiation power, and reaction time) may then be employed for large-scale (numbered up) continuous synthesis of the desired product under a similar characteristic length scale.

Multiplexing

According to one aspect, a plurality of reactors may be used to run multiple reactions at different temperatures simultaneously. These reactions can have different or similar compositions and reaction times. In some embodiments, oscillation movement within the reactors may be accomplished using an electromagnetic valve connected to two different pressure sources. By alternating between these two pressure levels, the droplet can move forward or backward.

The valve may be computer controlled. Each reactor may have its own electromagnetic valve to allow for independent reactions. One or more of the reactors may be curved to allow for single-point detection, as discussed above.

A multi-way selector valve may be used to guide each droplet toward its own reactor, and another multi-way valve may be used to guide the target droplet after completion of the reaction towards a sample loop for injection into a HPLC/MS unit or other component suitable for the desired application.

Figure 17A:
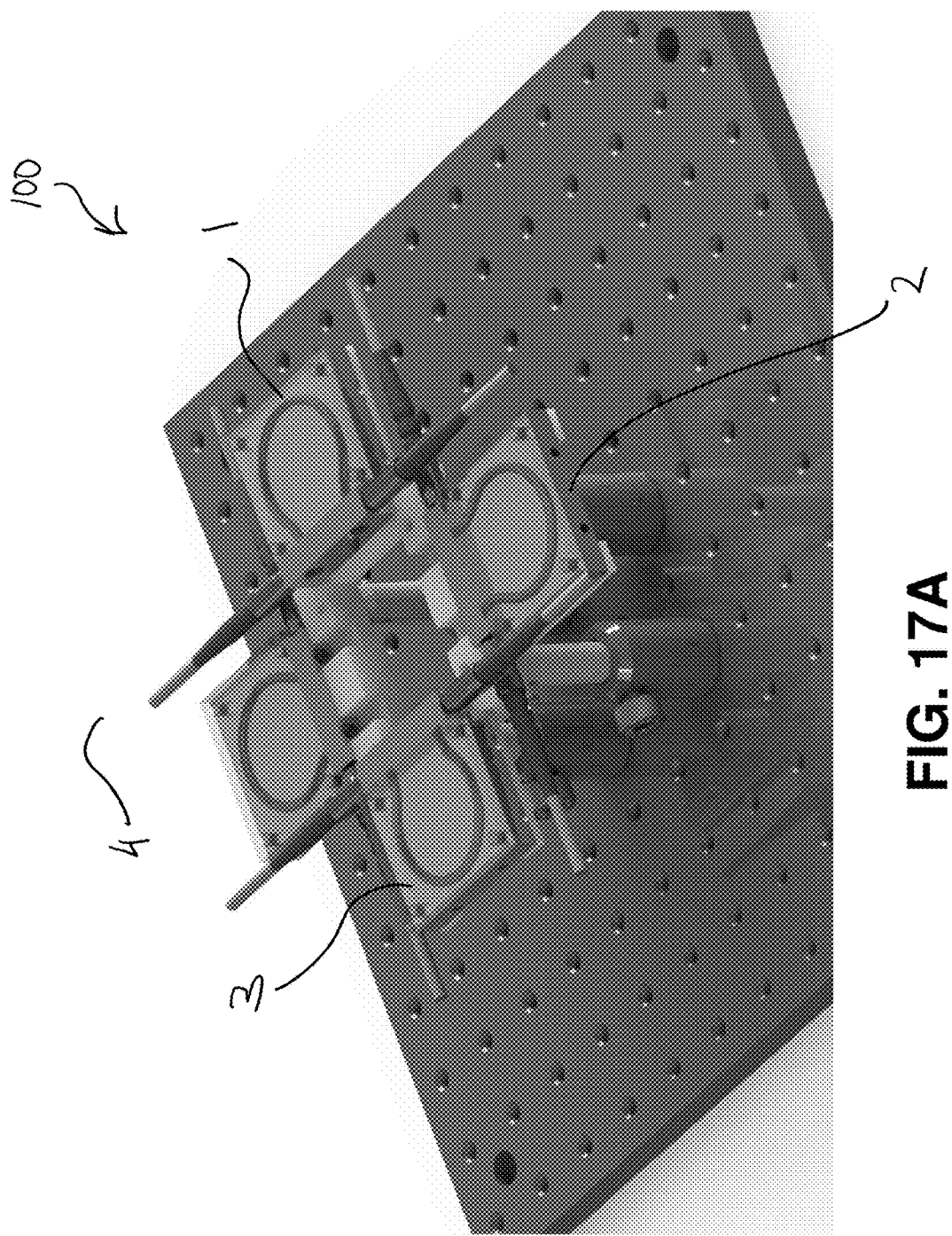
FIG. 17A depicts a perspective view of a multiplexed reactor arrangement.
Figure 17B:
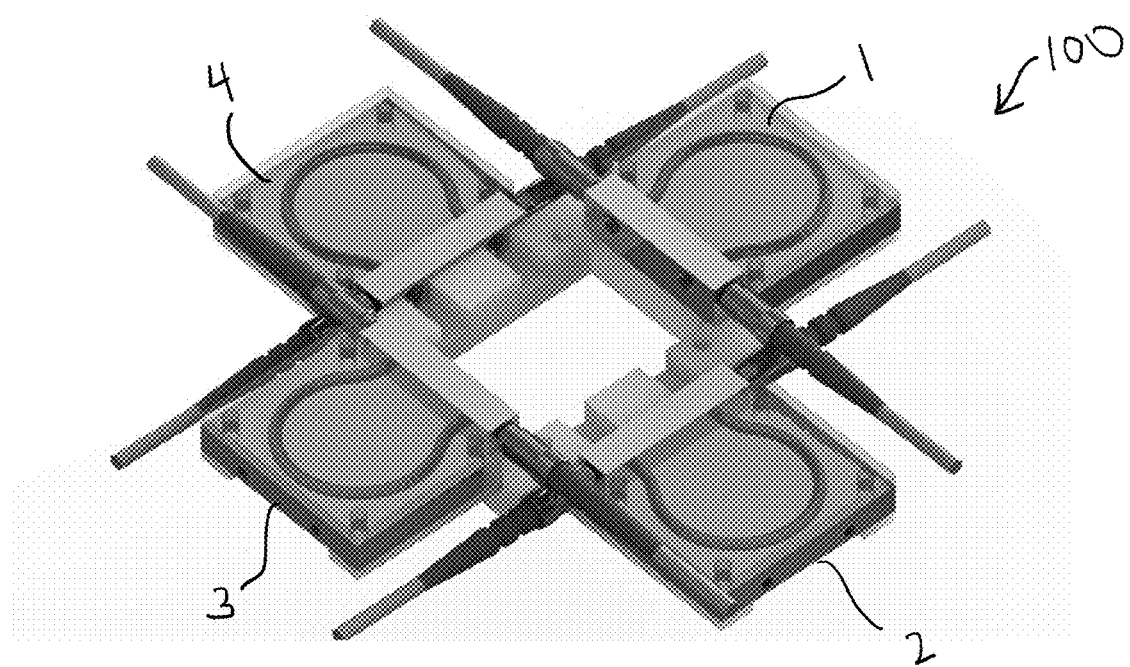
FIG. 17B depicts a detailed view of the multiplexed reactor arrangement shown in FIG. 17A.
Figure 18:
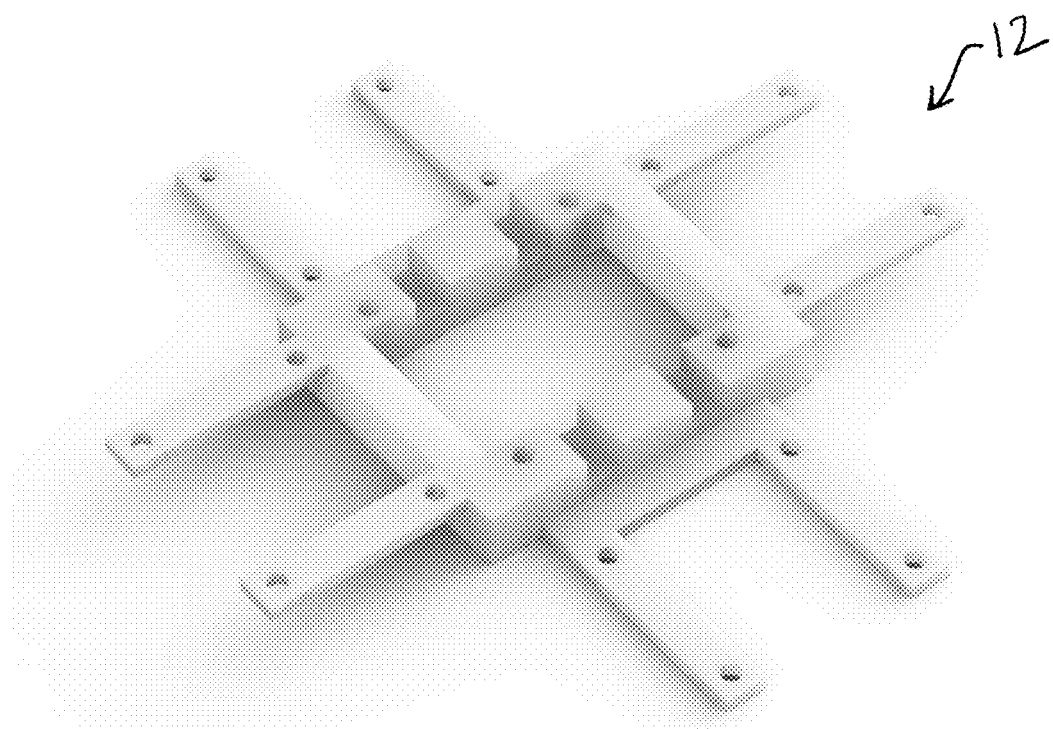
FIG. 18 depicts a support used in the multiplexed reactor arrangement shown in FIG. 17A.

One illustrative embodiment of a multiplexed reactor arrangement is shown in FIGS. 17A-19. As seen in FIGS. 17A-17B, the multiplexed arrangement 100 includes four reactors 1, 2, 3 and 4, each having a curved tubing and single optical port. The multiplexed arrangement may include a support 12, as seen in FIG. 18. The arrangement shown in FIGS. 17A-19 can run 4 different reactions simultaneously. However, in other embodiments, a multiplexed arrangement can be used to run 2, 3, 5, 6, 7 or 8 reactions at a time, depending on the number of reactors that are included in the arrangement. In some embodiments, the number of reactors in a multiplexed arrangement may be limited to the capacity of the multi-way selector valve.

Figure 19:
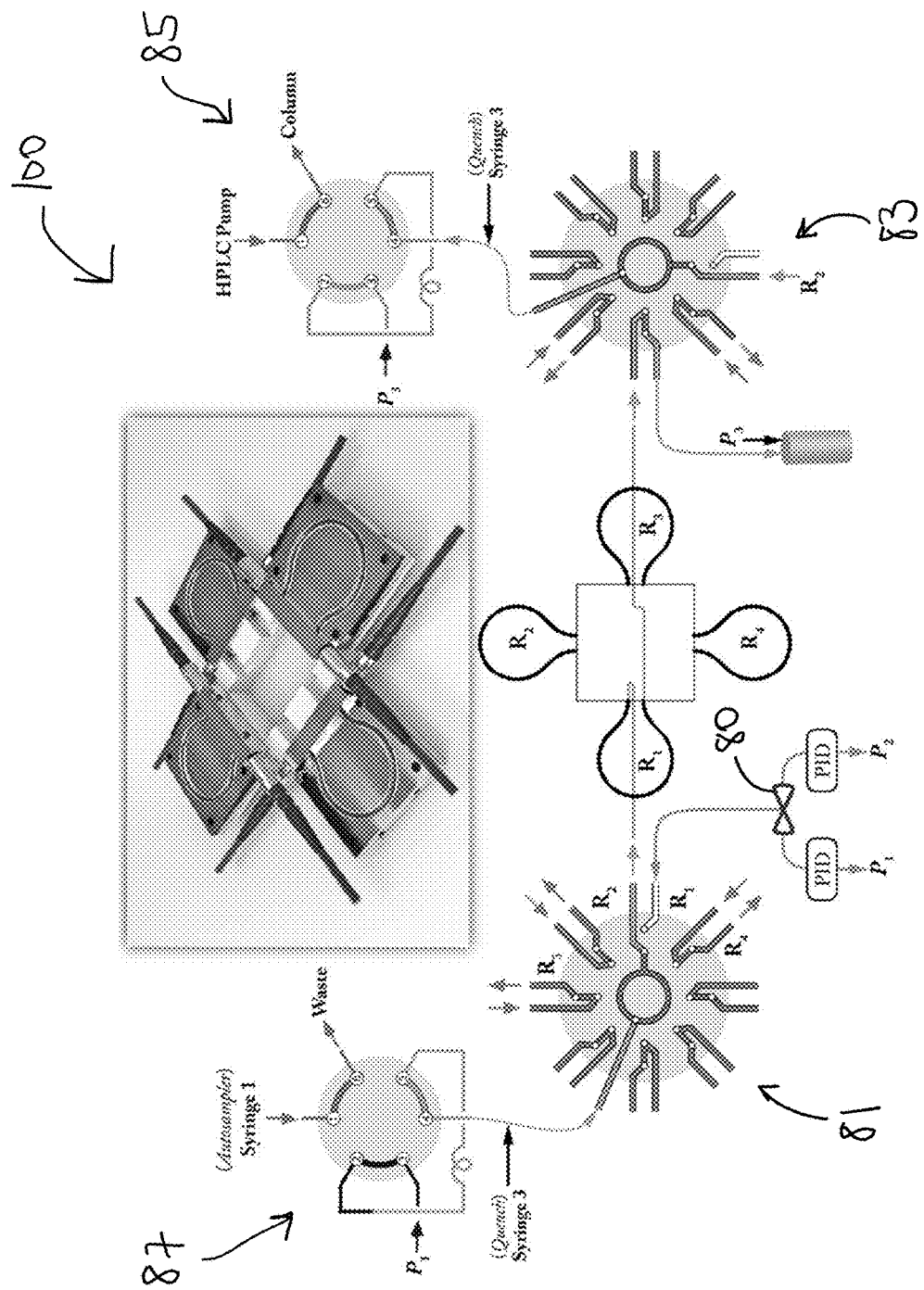
FIG. 19 depicts a schematic detailing the components of one embodiment of a multiplexed arrangement.

FIG. 19 is a schematic detailing the components of one embodiment of a multiplexed arrangement 100. The arrangement includes 4 reactors, $R_1$, $R_2$, $R_3$ and $R_4$.

The arrangement includes a multi-port (e.g. 6-port) injection valve 87 that allows for injection of a fixed volume (e.g., 2-40 uL) of the reagent mixture into the multiplexed reactor. The looped, lighter-colored line of 87 inside the circle is the sample loop (between 2-40 uL). In the initial configuration (during sample preparation), the sample loop is not connected to the autosampler line. After preparation of the desired reagent mixture, the valve is triggered to connect the sample loop to the line coming from the autosampler (e.g., for valve 87, port 1 connects to port 2, and port 5 connects to port 6). After loading the reagent sample into the sample loop, using Syringe 1, the valve gets triggered to go back into its original position. As a result, the injected sample gets connected to the reactor line (the lighter colored line going from port 4 to the selector valve).

The multi-port injection valve 87 is connected to a multi-way (e.g. 8-way) selector valve 81, which leads to the reactors. Each reactor line ($R_1$, $R_2$, $R_3$, and $R_4$) is connected to one of the output ports of the multi-way selector valve 81.

In some embodiments, oscillatory motion inside reactor $R_1$ is performed via an electromagnetic valve 80 connected to two different pressure sources, $P_1$ and $P_2$. $P_3$ is the pressure level at the outlet, and is maintained at a constant value. To allow for oscillatory motion of a droplet by switching between the two pressure levels $P_1$ and $P_2$, $P_1$ and $P_2$ are set at levels such that $P_3$ is at a level between $P_1$ and $P_2$. In other words, $P_1$ is set at a level that is lower than $P_3$, and $P_2$ is set at a level that is higher than $P_3$. In sum, $P_1 < P_3 < P_2$. Each of the other reactors has its own electromagnetic valve to control oscillatory movement.

A multi-way (e.g. 8-way) selector valve 83 is used to guide the target droplet after completion of the reaction towards a sample loop 85 for injection into a high performance liquid chromatography (HPLC) or liquid chromatography-mass spectrometry (LC-MS) unit. In this embodiment, the sample loop 85 is a 6-port valve.

Each reactor line ($R_1$, $R_2$, $R_3$, and $R_4$) is connected to one of the input ports of the multi-way selector valve 83, while the common outlet port is connected to another multi-port (e.g. 6-port) injection valve 85 for sampling of each droplet coming from different reactors. Triggering of the multi-way selector valve 83 to the correct position after completion of each reaction (e.g., connecting the common outlet of the multi-way selector valve 83 to the line coming from reactor R₂) enables automated sampling of the reaction mixtures without interfering with the other droplets or reactors.

While aspects of the invention have been described with reference to various illustrative embodiments, such aspects are not limited to the embodiments described. Thus, it is evident that many alternatives, modifications, and variations of the embodiments described will be apparent to those skilled in the art. Accordingly, embodiments as set forth herein are intended to be illustrative, not limiting. Various changes may be made without departing from the spirit of aspects of the invention.

What is claimed is:

1. An oscillatory flow reactor comprising:
   a sample port;
   a carrier phase port; and
   a tubing having a centerline running through a lumen of the tubing from a first end of the tubing to a second end of the tubing, the tubing being curved such that an imaginary straight line intersects with the centerline at least twice such that at least two portions of the tubing are aligned and observable with a single optical port.
2. The oscillatory flow reactor of claim 1, wherein the imaginary straight line is substantially perpendicular to the centerline of the tubing.
3. The oscillatory flow reactor of claim 1, further comprising:
   a pressure source; and
   one or more sensors aligned with the imaginary straight line which provide sample location feedback to the pressure source to control oscillatory motion of a sample based at least in part on sample location.
4. The oscillatory flow reactor of claim 3, wherein the one or more sensors comprise one or more photodetectors.
5. The oscillatory flow reactor of claim 4, further comprising a light source corresponding to each of the one or more photodetectors.
6. The oscillatory flow reactor of claim 1, further comprising:
   a heater adapted to heat contents in the tubing; and
   a housing supporting the tubing and the heater.
7. The oscillatory flow reactor of claim 1, wherein the tubing is horseshoe-shaped.
8. The oscillatory flow reactor of claim 1, wherein the tubing is U-shaped.
9. The oscillatory flow reactor of claim 1, wherein the tubing has an inner surface comprising a fluoropolymer.
10. The oscillatory flow reactor of claim 9, wherein the fluoropolymer comprises at least one of FEP, PTFE or PFA.
11. The oscillatory flow reactor of claim 3, wherein the one or more sensors comprises a first sensor positioned at one portion of the tubing and a second sensor positioned at another portion of the tubing, and the length along the tubing from the first sensor to the second sensor is greater than 1 cm and the distance from the first sensor to the second sensor is less than the length along the tubing from the first sensor to the second sensor.
12. A method of using an oscillatory flow reactor comprising:
   injecting an aqueous droplet into a tubing, the tubing having an inner surface comprising a fluoropolymer;
   injecting an organic substance droplet into the tubing; and
   producing oscillatory flow of the aqueous droplet and the organic substance droplet through application of alternating pressure to the tubing, such that the aqueous droplet moves through the organic substance droplet with each oscillation,
   wherein the oscillatory flow reactor further comprises:
   a housing supporting the tubing;
   a carrier phase port in fluid communication with the tubing; and
   a sample port in fluid communication with the tubing.
13. The method of claim 12, wherein the oscillatory flow reactor further comprises:
   a pressure source; and
   one or more sensors which provide sample location feedback to the pressure source to control oscillatory motion of a sample based at least in part on sample location.
14. The method of claim 12, wherein the fluoropolymer comprises at least one of FEP, PTFE or PFA.
15. An oscillatory flow reactor comprising:
   a tubing having an inner surface comprising a fluoropolymer, such that an aqueous droplet moves through an organic substance droplet in the tubing during application of alternating pressure to the tubing;
   a housing supporting the tubing;
   a carrier phase port in fluid communication with the tubing; and
   a sample port in fluid communication with the tubing.
16. The oscillatory flow reactor of claim 15, further comprising:
   a pressure source; and
   one or more sensors which provide sample location feedback to the pressure source to control oscillatory motion of a sample based at least in part on sample location.
17. The oscillatory flow reactor of claim 15, wherein the tubing has a curved shape such that at least two portions of the tubing are aligned and observable with a single optical port.
18. The oscillatory flow reactor of claim 16, wherein the one or more sensors comprises a first sensor positioned at one portion of the tubing and a second sensor positioned at another portion of the tubing, and the length along the tubing from the first sensor to the second sensor is greater than 1 cm.
19. The oscillatory flow reactor of claim 15, wherein the fluoropolymer comprises at least one of FEP, PTFE or PFA.
20. The oscillatory flow reactor of claim 19, wherein the fluoropolymer comprises FEP.

* * * * *